United States Patent [19]

Stanton et al.

[11] 4,179,729
[45] Dec. 18, 1979

[54] ROTARY ELECTRIC MACHINE AND POWER CONVERSION SYSTEM USING SAME

[75] Inventors: William E. Stanton, Newton; David B. Eisenhaure, Hull; George A. Oberbeck, Belmont; Kenneth Fertig, Sudbury, all of Mass.

[73] Assignee: The Charles Stark Draper Laboratory, Inc., Cambridge, Mass.

[21] Appl. No.: 787,930

[22] Filed: Apr. 15, 1977

[51] Int. Cl.² ............................................. H02M 7/00
[52] U.S. Cl. ..................................... 363/175; 318/150; 318/158; 322/4
[58] Field of Search .................... 322/4, 20, 32, 63, 66; 318/150, 158; 307/73; 363/102, 150, 174, 175

[56] References Cited

U.S. PATENT DOCUMENTS

| | | | |
|---|---|---|---|
| 3,512,074 | 5/1970 | Soper | 322/63 X |
| 4,035,712 | 7/1977 | Yarrow et al. | 363/174 X |
| 4,066,957 | 1/1978 | Seeger | 363/175 X |

OTHER PUBLICATIONS

"Interim Report on Research Toward Improved Flywheel Suspension and Energy Conversion Systems", D. Eisenhower, G. Oberbeck, S. O'Dea, W. Stanton, The Charles Stark Draper Laboratory, Inc., Mar. 1976.

*Primary Examiner*—William M. Shoop
*Attorney, Agent, or Firm*—Joseph S. Iandiorio

[57] ABSTRACT

A power conversion system for converting between electrical power at different frequencies, including a rotary electrical machine including a rotor, a stator, first and second independently controllable field windings, and at least one armature winding for each phase; a switching circuit including a plurality of switching devices and having first terminal means interconnected with the armature winding which carries a high frequency signal established by the machine, and a second terminal for interconnection with an impedance establishing a lower frequency signal; the first field control circuit for monitoring the machine to sense phase difference between the optimum zero crossings and actual zero crossings of the higher frequency signal for driving the first field winding to adjust the phase of the higher frequency signal to minimize the phase difference; a second field control circuit for modulating the higher frequency signal carried by the armature winding with the lower frequency signal and for monitoring the second terminal means to sense amplitude difference between a selected one of the voltage and current parameters of the lower frequency signal and a reference level for driving the second field winding to adjust that parameter towards the reference level; and a switch firing circuit responsive to the machine voltage and one of the voltage and current parameters of the lower frequency signal at the second terminal means for selectively triggering to the on state and self-commutating to the off state the switching devices synchronously with the zero crossings of the higher frequency signal for transferring power between the higher and lower frequency signals through the switching circuit.

21 Claims, 21 Drawing Figures

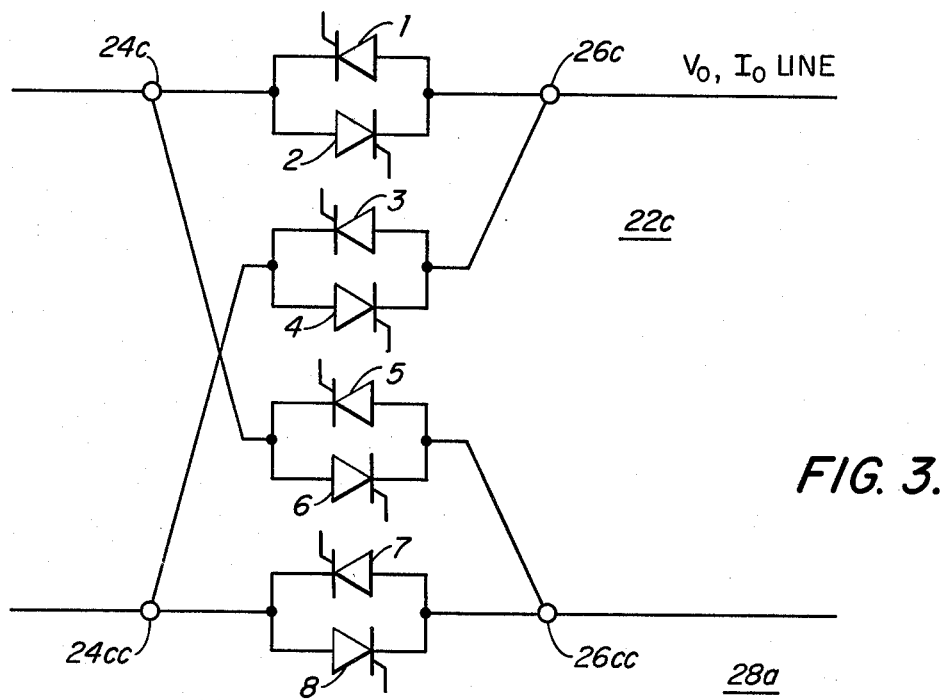
FIG. 3.
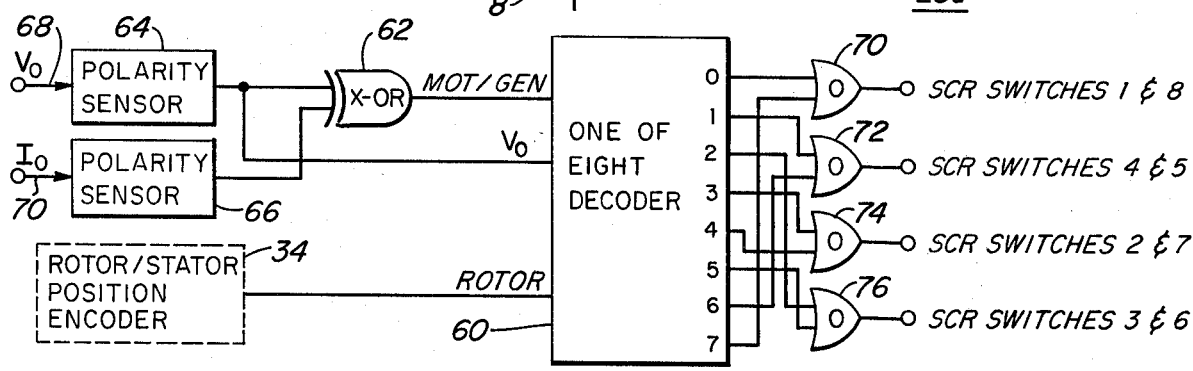
FIG. 4.
| DECODER TRUTH TABLE ||| |||||||||
|---|---|---|---|---|---|---|---|---|---|---|
| INPUTS ||| OUTPUTS ||||||||
| MOT/ GEN | $+V_0$ | ROTOR + | 0 | 1 | 2 | 3 | 4 | 5 | 6 | 7 |
| 1 | 1 | 1 | 1 | 0 | 0 | 0 | 0 | 0 | 0 | 0 |
| 1 | 1 | 0 | 0 | 1 | 0 | 0 | 0 | 0 | 0 | 0 |
| 1 | 0 | 1 | 0 | 0 | 1 | 0 | 0 | 0 | 0 | 0 |
| 1 | 0 | 0 | 0 | 0 | 0 | 1 | 0 | 0 | 0 | 0 |
| 0 | 1 | 1 | 0 | 0 | 0 | 0 | 1 | 0 | 0 | 0 |
| 0 | 1 | 0 | 0 | 0 | 0 | 0 | 0 | 1 | 0 | 0 |
| 0 | 0 | 1 | 0 | 0 | 0 | 0 | 0 | 0 | 1 | 0 |
| 0 | 0 | 0 | 0 | 0 | 0 | 0 | 0 | 0 | 0 | 1 |
FIG. 4A.

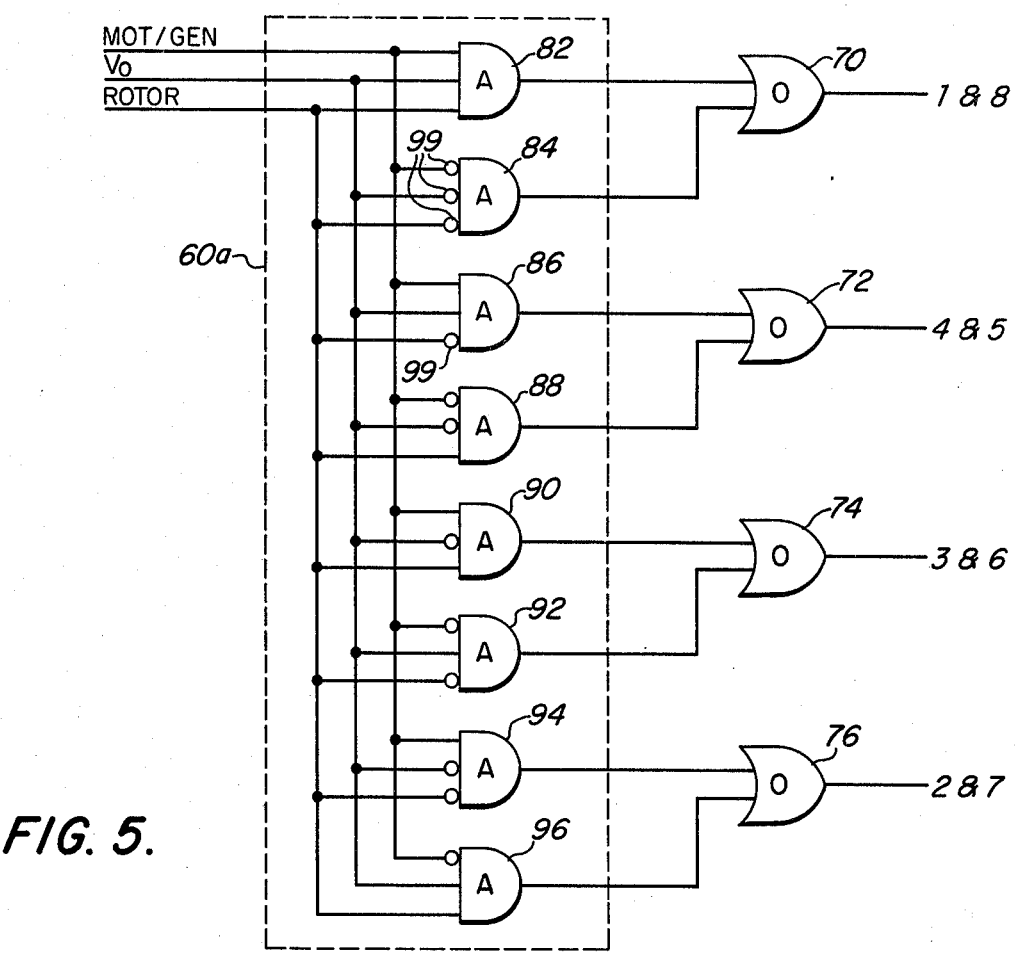
FIG. 5.
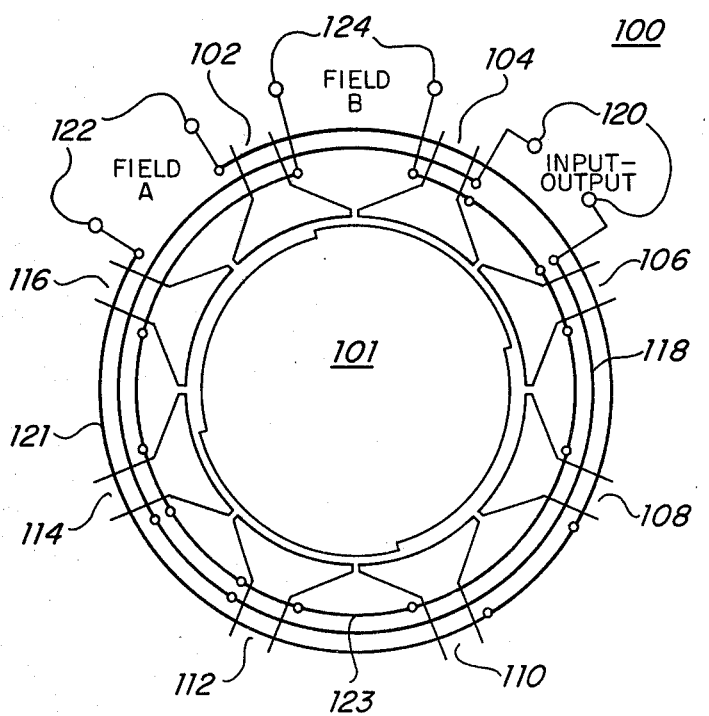
FIG. 6.
| TOOTH | FIELDS |
|-------|--------|
| 102 | A + B |
| 104 | A − B |
| 106 | A + B |
| 108 | A − B |
| 110 | − A − B |
| 112 | − A + B |
| 114 | − A − B |
| 116 | − A + B |
FIG. 6A.

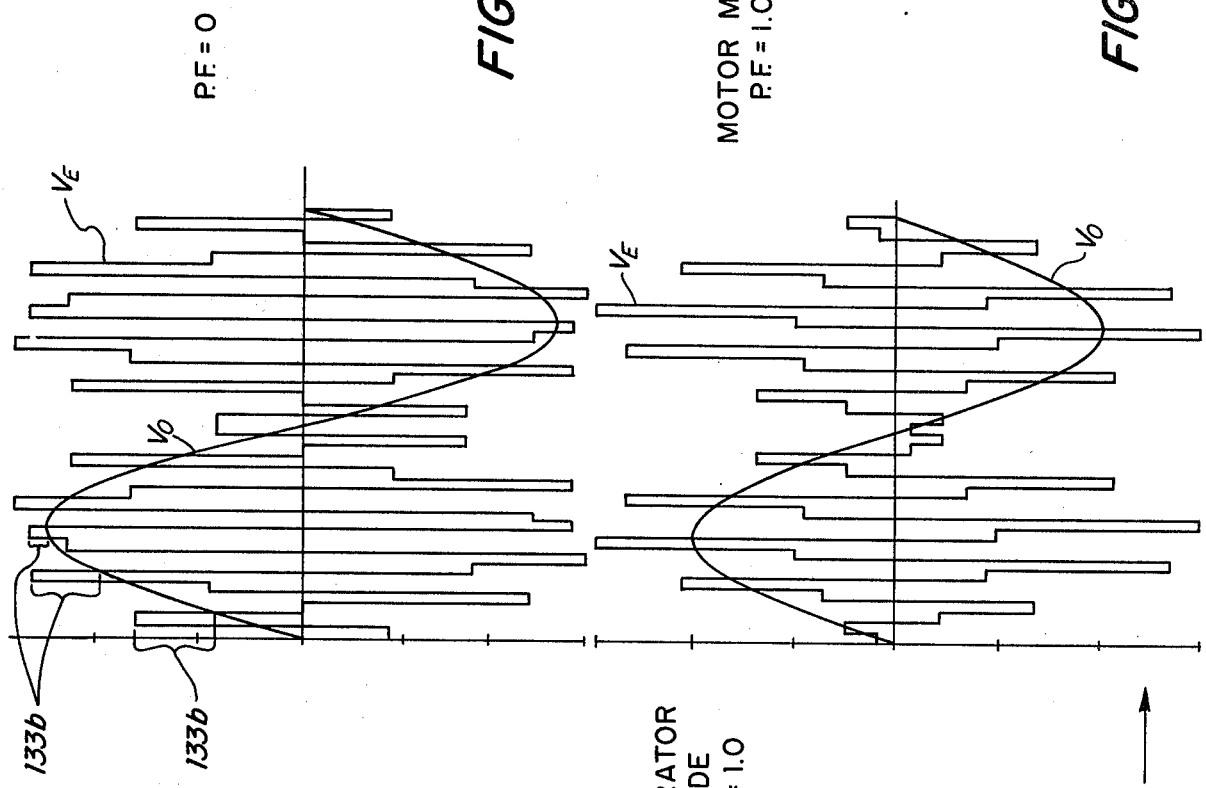
FIG. 11B.
FIG. 11C.
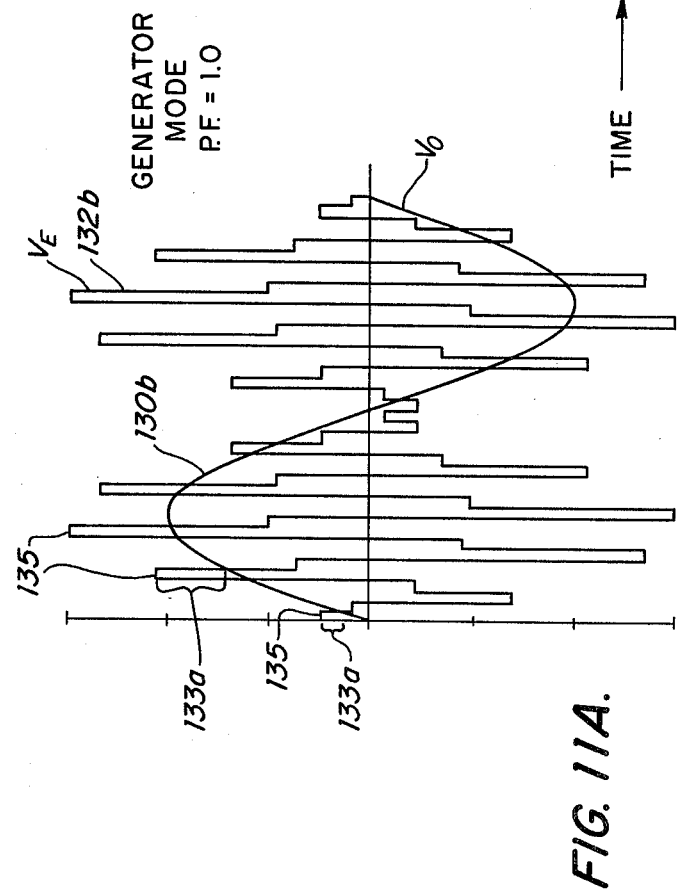
FIG. 11A.

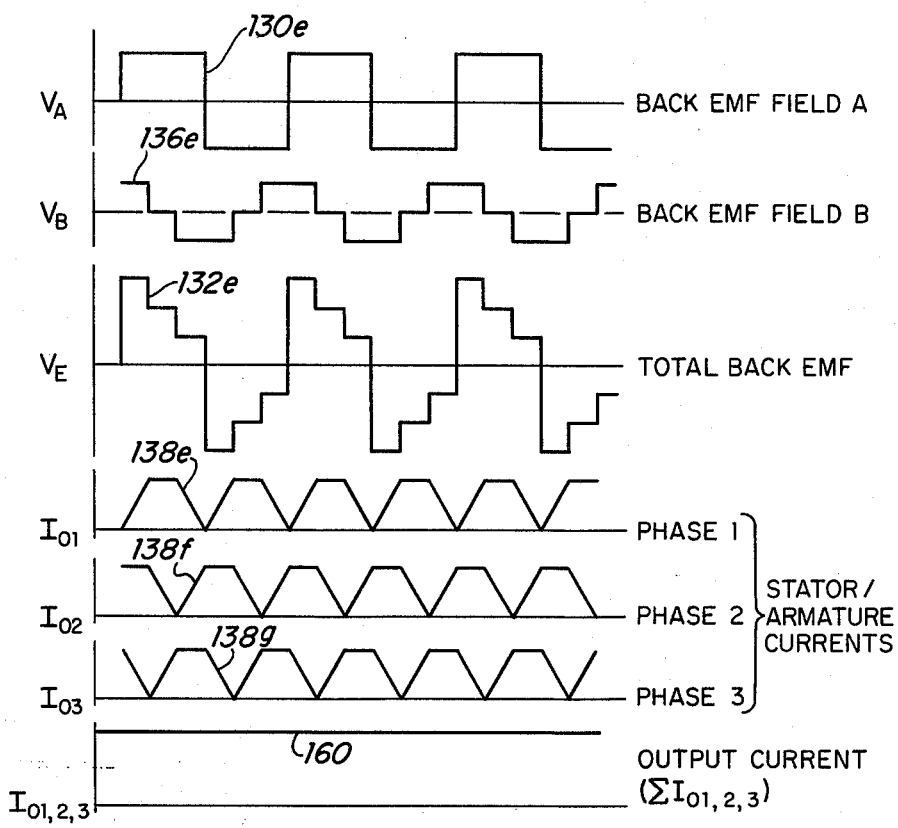
*FIG. 12.*
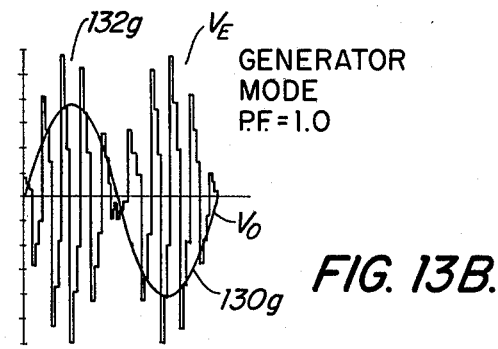
*FIG. 13B.*
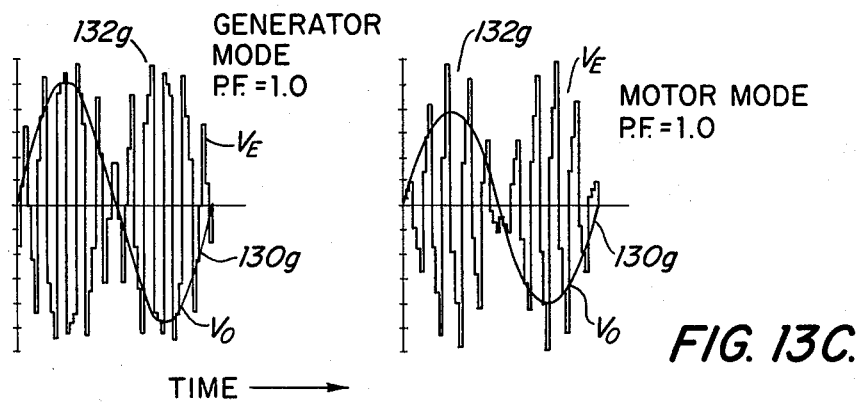
*FIG. 13A.*      *FIG. 13C.*
TIME ⟶

ROTARY ELECTRIC MACHINE AND POWER CONVERSION SYSTEM USING SAME

FIELD OF INVENTION

This invention relates to a power conversion system for converting between electrical power at different frequencies, and to a rotary electrical machine for use therein.

BACKGROUND OF INVENTION

Investigation of power conversion systems applicable to high speed and variable speed shafts have received much attention recently because of their ability to generate power at higher speeds with reduced weight and size. They are of particular interest due to recent interest in their use with windmills and flywheels. In flywheel storage systems the conversion system, and particularly the motor generator machine, must be capable in one mode of generating power at higher and variable frequencies and presenting it at constant and conventional lower frequency and in another mode of accepting power at the constant lower frequency and converting it to a higher variable frequency to drive the flywheel. When used with windmills and other prime power sources the system must be capable of converting the generated higher varying frequency electrical signals to constant lower frequency signals. See *Report R-960, Interim Report on Research Toward Improved Flywheel Suspension and Energy Conversion Systems*, by David Eisenhaure, George Oberbeck, Stephen O'Dea, and William Stanton.

In general, the variable speed (frequency) power must be converted to an existing fixed frequency for use. Many different combinations of conventional power conversion systems have been applied to this task, each with its own deficiencies. Typical systems have employed multiple machine configurations, variable mechanical speed reducers, A.C.- D.C.-A.C. converter-inverters, cycloconverters, field modulated down converters and many other arrangements. Many of these systems have suffered from large weight and size, inefficiency due to poor waveform quality and form factor, or unreliability due to complexity and switching losses.

SUMMARY OF INVENTION

It is therefore an object of this invention to provide an improved, efficient, integrated power conversion system for converting between electrical power at different frequencies, and an improved extremely efficient rotary electrical machine for use therein.

It is a further object of this invention to provide such an improved system capable of transferring power either from the lower to the higher or the higher to the lower frequency whether the frequencies are fixed or varying.

It is a further object of this invention to provide such an improved system which reduces harmonic content of the waveforms and the need for filtering.

It is a further object of this invention to provide such an improved system which produces controlled voltage, frequency and power output despite varying frequency input.

It is a further object of this invention to provide such an improved system in which the rotary electrical machine is a single unit.

It is a further object of this invention to provide such an improved system which may be used as a stand-alone power supply or may be coupled with a power line.

The invention results from the realization that an improved rotary electrical machine, for utilization with switching circuitry of an improved power conversion system, can be constructed using two independently controllable fields which induce a back EMF in the rotary machine compatible with self-commutating operation of the switching circuitry, and further that the controllable fields can also be used to control relative amplitudes and phases of the output voltage and current.

The invention features a power conversion sytem for converting electrical power at different frequencies. It includes a rotary electrical machine including a rotor, a stator, first and second independently controllable field windings, and at least one armature winding for each phase. There is a switching circuit including a plurality of switching devices and having first terminal means interconnected with the armature winding which carries a higher frequency signal established by the machine and a second terminal means for interconnection with an impedance which establishes a lower frequency signal. The lower frequency signal can be a zero frequency or D.C. signal. A first field control circuit monitors the machine to sense phase difference between the optimum zero crossings and actual zero crossings of the higher frequency signal for driving the first field winding to adjust the phase of the higher frequency signal to minimize the phase difference. A second field control circuit modulates the higher frequency signal carried by the armature winding with the lower frequency signal and monitors the second terminal means to sense amplitude difference between the selected one of the voltage and current parameters of the lower frequency signal and a reference level for driving the second field winding to adjust that parameter towards the reference level. A switch firing circuit responsive to the machine and to the voltage and current parameter of the lower frequency signal at the second terminal means selectively triggers the on state and self-commutates to the off state the switching devices synchronously with the zero crossings of the higher frequency signal, for transferring power between the higher and lower frequency through the switching circuit.

The invention also features a rotary electrical machine, such as a motor generator, motor, or generator, having a rotor, a stator, an armature, and dual independently controllable field windings in spaced quadrature for selectively shaping the back EMF waveform of the machine to control amplitude and phase relations between the voltage and current outputs of the machine.

In a preferred embodiment the rotary machine may be a motor-generator or a motor or a generator. If it is a motor-generator capable of operating in a motor mode and a generator mode, its rotor is adapted for mechanical load and/or drive. The impedance is an electrical load and/or power source and the power transfer through the switching circuit occurs in the generator mode by detecting the lower frequency signal from the modulated higher frequency signal and presenting the lower frequency signal at the second terminal means, and in the motor mode by chopping the lower frequency signal at the frequency of the higher frequency signal and presenting it at the first terminal means.

When the machine is a motor, the impedance is an electrical power source and the power transfer through the switching circuit occurs by the chopping of the lower frequency signal at the frequency of the higher frequency signal and presenting it at the first terminal means. When the machine is a generator, the impedance is an electrical load and the power transfer through the switching circuit occurs by detecting the lower frequency signal from the higher frequency signal and presenting it at the second terminal means.

When the impedance includes an electrical power source such as a utility company power line, the second field control circuit monitors the current parameter of the lower frequency signal at the second terminal means and when the system is operating as a stand-alone system, the second field control circuit monitors the voltage parameter of the lower frequency signal at the second terminal means.

DISCLOSURE OF PREFERRED EMBODIMENT

Other objects, features and advantages will occur from the following description of preferred embodiments and the accompanying drawings, in which:

FIG. 3 is a more detailed schematic diagram of the switching circuit of FIG. 1;

FIG. 4 is a more detailed schematic diagram of the firing circuit of FIG. 1;

FIG. 4A is a truth table showing the inputs and outputs for the decoder of FIG. 4;

FIG. 5 is a schematic diagram of a circuit which may be used to implement the decoder of FIG. 4;

FIG. 6 is a cross-sectional schematic diagram of a two phase inductor motor-generator which may be used to implement the rotary electrical machine of FIG. 1 according to a second feature of this invention;

FIG. 6A is a table showing the combinative effect of the two fields A and B at each of the eight poles of the motor-generator of FIG. 6;

FIG. 11A shows the relationship of the back EMF voltage and the output voltage for one phase of a two-phase system supplying an alternating current load when the machine is operating in the generator mode with unity power factor;

FIG. 11B is an illustration similar to FIG. 11A with a power factor of zero;

FIG. 11C is an illustration similar to FIG. 11A in the motor mode for a unity power factor;

FIG. 12 is a chart illustrating idealized waveforms in the case of a zero frequency or D.C. lower frequency signal for a three-phase system, similar to the wave shapes shown in FIGS. 7, 8, and 9;

Figure 14:
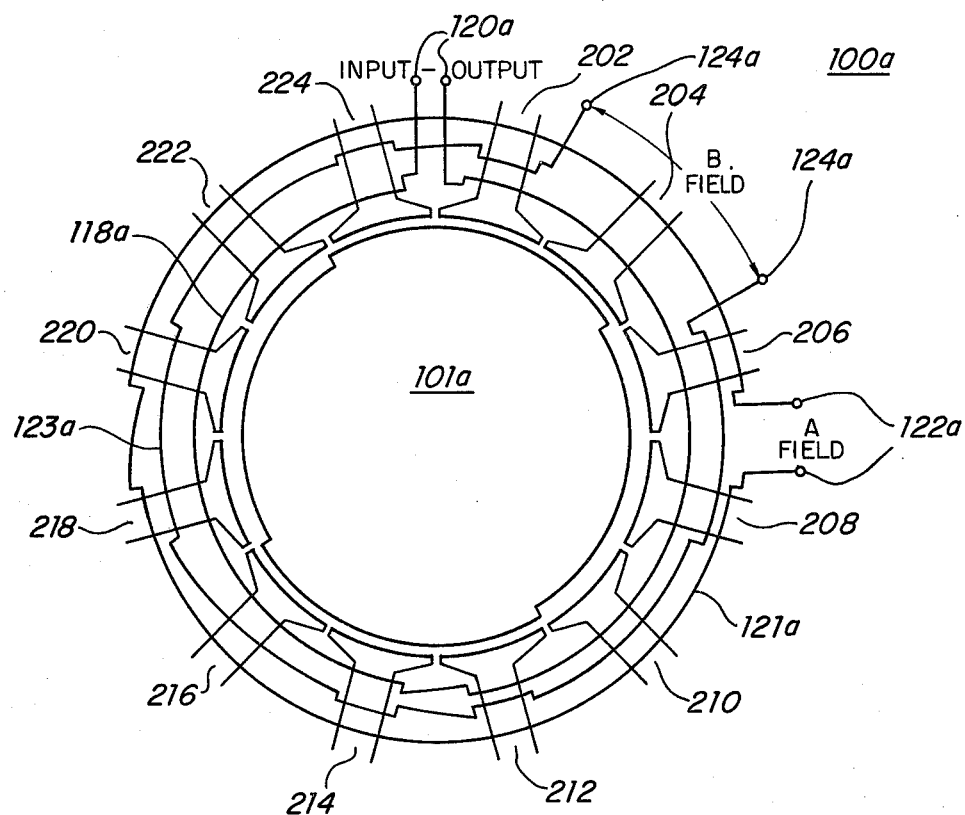
Figure 15:
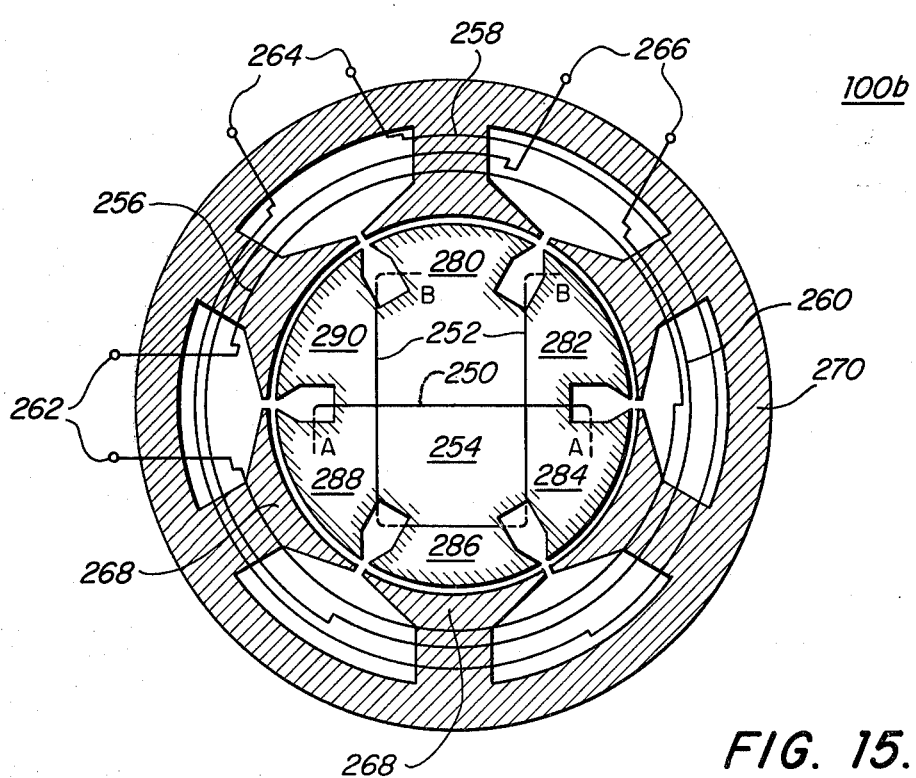

FIGS. 13A, B, and C illustrate the relative condition of the voltage output waveforms and the back EMF of the machine operating at unity power factor and zero power factor as a generator, and as a motor at unity power factor;

FIG. 14 is a cross-section diagram showing the one-phase portion of a three-phase inductor generator similar to FIG. 6; and FIG. 15 is a view similar to FIGS. 6 and 14 of a three-phase wound rotor generator design in which the armature windings are on the stator and the fields are on the rotor.

The power conversion system according to this invention may be accomplished using a rotary electrical machine including a rotor, a stator, first and second independently controlled field windings, and at least one armature winding for each phase. There may be one or more phases, the field windings may be either on the stator or the rotor. The system includes a switching circuit including a plurality of switching devices such as SCR's, and the switching circuit includes a first terminal interconnected with the armature winding which carries a higher frequency signal inherently established by the machine operation and a second terminal for interconnection with an impedance, either a load impedance or a power source impedance, which establishes a lower frequency signal at that terminal. The lower frequency signal may be zero frequency or D.C., as well as A.C. There is a first field control circuit for monitoring the machine voltage to sense the phase difference between the optimum zero crossings and the actual zero crossings of the higher frequency signal for driving the first field winding to adjust the phase of the higher frequency signal and minimize that phase difference. In effect, the phase difference between the output voltage and output current of the machine is being monitored in this way. The internal voltage of the machine which determines the optimum zero crossings may be monitored using an encoder which indicates the relative position of the rotor and stator. The actual zero crossings indicative of the output current zero crossings may be determined by a polarity indicator. Any phase difference between the two generates an error signal which is fed to the first field which drives the machine to correct that error.

There is a second field control circuit for modulating the higher frequency signal carried by the armature winding with the lower frequency signal, and for monitoring the second terminal of the switching circuit to sense the amplitude difference between the selected one of the voltage and current parameters of the lower frequency signal and a reference level, for driving the second field winding to adjust that parameter towards the reference level. If the second terminal means of the switching circuit is coupled to an external power source, then it is the current parameter that is sensed, and the reference is a current level. The two are combined in a comparator and an error signal is used to drive the second field to adjust the amplitude and phase of the output current relative to the output voltage.

The rotary electrical machine may be a motor-generator if bi-directional power conversion is desired, or may be simply a motor or simply a generator. If it is a motor-generator, the shaft of the motor-generator is typically connected to a device such as a flywheel, which may either provide mechanical force to drive the generator in the generator mode or be driven by the motor in the motor mode. In such a case, the switching circuit would be connected to an impedance which would operate in the motor mode as a power source and in the generator mode as a load. Similar arrangements would adhere in the motor and in the generator modes. When the system is operating in the stand-alone mode, that is, it is not coupled to an external power source, the comparator in the second field control circuit monitors the voltage parameter on the output from the switching circuit, and the reference parameter is a reference voltage.

Report R-960, *Interim Report on Research Toward Improved Flywheel Suspension and Energy Conversion Systems*, by David Eisenhaure, George Oberbeck, Stephen O'Dea, and William Stanton, is incorporated here by reference.

Figure 1:
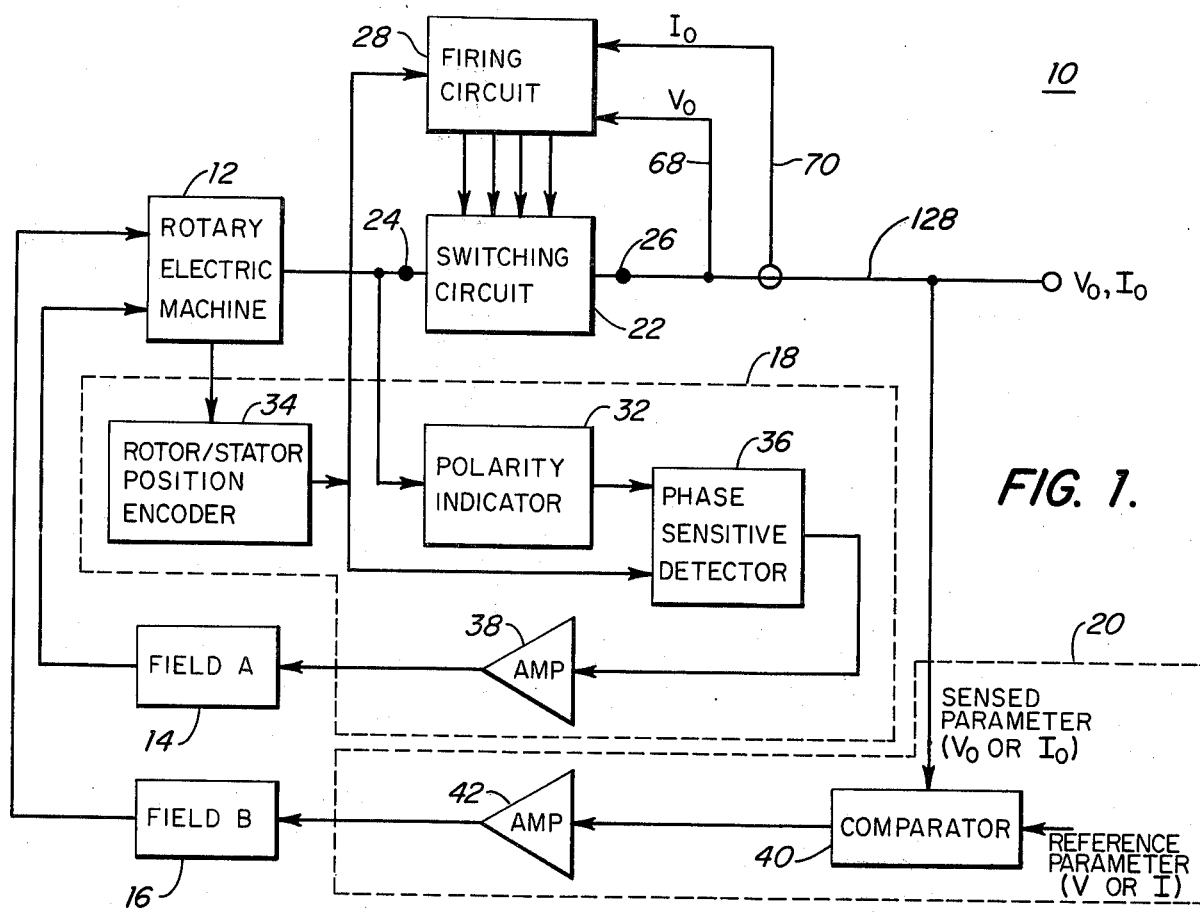
FIG. 1 is a schematic block diagram of a power conversion system according to one feature of this invention.

There is shown in FIG. 1 a power conversion system 10 according to this invention including a rotary electrical machine 12 having a first field, field A 14, and a second field, field B 16. Field A is fed by field A control circuit 18, and field B by field B control circuit 20. Switching circuit 22 having a first terminal 24 connected to the output of rotary machine 12 and a second terminal 26 connected to the output line 128, chops the lower frequency signal at terminal 26 at a frequency equal to the higher frequency provided in machine 12 in the motor mode, and detects the lower frequency envelope of the higher frequency signal produced in machine 12 in the generator mode. The switching circuit is controlled by firing circuit 28, which synchronously switches circuit 22 in a sequence dependent upon the mode of operation of machine 12, motor or generator, and the optimum zero crossover point of the voltage output from machine 12.

Field control circuit 18 includes a polarity indicator 32 which provides a signal each time the higher frequency signal at terminal 24 crosses zero, i.e. the actual time that the output current crosses zero, and a rotor/stator position encoder 34 which, by reference to the position of the rotor relative to the stator, provides a signal indicating the optimum zero crossover time, or the time that the voltage crosses zero. The outputs of polarity indicator 32 and encoder 34 are submitted to a phase-sensitive detector 36, which provides an error to amplifier 38 if there is a phase difference detected. Amplifier 38, in response to an error signal, drives field A to adjust the phase of the output current relative to the output voltage in terminal 24 and eliminate the error. Field control circuit 20 includes a comparator 40 which senses either the voltage or the current parameter on output line 128 and compares it with a like reference parameter, voltage or current respectively, to provide an error signal if there is a difference between the two parameters. That error signal is provided to amplifier 42, which responds by driving field B 16 to adjust the amplitude and phase relationship of the output current and voltage to minimize that error. If output line 128 is coupled to an external power source, then the relevant parameter is current.

Throughout the specification, similar parts have been given similar numbers accompanied by a lower case letter.

Figure 2:
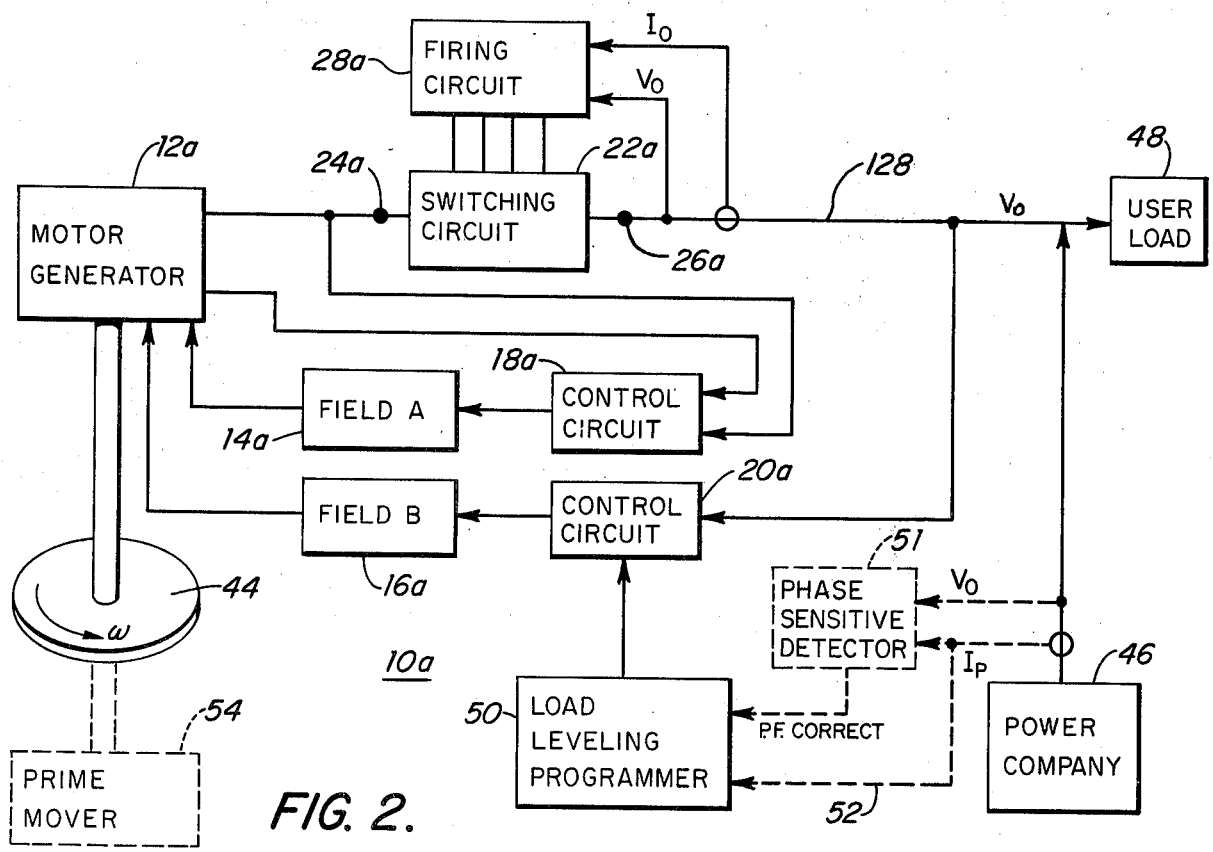
FIG. 2 is a schematic block diagram similar to FIG. 1 showing the power conversion system according to this invention including a motor generator and being coupled to an external power source.

Alternatively, as shown in FIG. 2, rotary electrical machine 12a may be a motor-generator having a flywheel 44 connected to a shaft. System 10a is coupled with an external power source, such as power company 46, which together with system 10a supplies user load 48, such as a residence. Such a system may be used to maintain constant loading on power company 46, so that during peak periods system 10a operates as a generator to take energy from flywheel 44 and supply power to user load 48 in conjunction with that supplied by power company 46, while during low power drain periods, when user load 48 is below that constant set for power company 46, the extra power is supplied through switching circuit 22a to motor-generator 12a operating as a motor, which drives flywheel 44 to store energy therein. When it is desirable to have a varying reference to comparator 40 in field control circuit 20a, a load levelling programmer 50, which varies the reference level over a period of time, may be used. Load levelling programmer 50 may be a fixed, cyclical program or it may respond to real time inputs, such as the drain on the power company 46 output, as indicated by dashed line 52. In addition to these applications a prime mover 54, such as a windmill, may be used to drive flywheel 44 and motor-generator 12a in the generator mode. System 10a is not restricted to stationary uses, as it may be used to power vehicles as well. In a vehicle, flywheel 44 may be used to drive motor-generator 12a as a generator, to drive another motor-generator set which drives the wheels of an automobile and, during downhill runs when the automobile is coasting, the second motor-generator set may be used to supply power to switching circuit 22a to drive motor-generator 12a as a motor and put energy into flywheel 44.

Switching circuit 22 may include a plurality of switching devices SCR's 1-8, circuit 22c, FIG. 3. SCR's 1-8 are connected in pairs, in parallel, and oppositely polarized. SCR's 1 and 2 are connected directly between terminals 24 and 26. Terminals 24 and 26 may include two busses 24c and 24cc and 26c and 26cc, respectively. The first pair of SCR's 1 and 2 are connected between terminals 24c and 26c; SCR's 7 and 8 are connected between terminals 24cc and 26cc; SCR's 3 and 4 are cross-connected from terminal 24cc to terminal 26c; and SCR's 5 and 6 are connected from terminals 24c to 26cc. There may be one such group of SCR's or other semiconductor devices for each output phase of the system.

Switching circuit 22 is fired in a synchronous pattern with the high-frequency signal from rotary machine 12 by means of firing circuit 28a, FIG. 4, which includes a one of eight decoder 60 having eight outputs labelled 0 through 7, and having three inputs: one from exclusive OR gate 62 and one from polarity sensor 64, and one from rotor/stator position encoder 34. The inputs to exclusive OR gate 62 are from polarity sensors 64 and 66. Polarity sensor 64 senses the output voltage $V_O$ on line 28, while polarity sensor 66 senses the polarity of output current $I_O$ on line 128, through lines 68 and 70 respectively. When the polarities of the output voltage and current are different, exclusive OR gate 62 indicates operation in the motor mode, and when they are the same, in the generator mode. The eight outputs labelled 0-7 of decoder 60 are fed through OR gates 70, 72, 74, and 76, which respectively operate SCR switches 1 and 8; 4 and 5; 2 and 7; and 3 and 6; FIG. 3. A truth table 80 for decoder 60 is shown in FIG. 4A. A 1 indicates motor operation and 0 indicates generator operation in the motor-generator column. In the $V_O$ column, 1 indicates positive output voltage and 0 negative output voltage; and in the rotor column, 1 represents that the rotor position indicates positive machine voltage and a 0 negative machine voltage. Thus in the motor mode, when $V_O$ is positive, first SCR'1 and 8 will be fired when the back EMF is positive, and SCR's 3 and 6 will be fired when the back EMF is negative. In the generator mode, SCR's 2 and 7 will be fired for positive back EMF, and then SCR's 4 and 5 will be fired for negative back EMF. For negative $V_O$, in the generator mode SCR's 3 and 6 are fired for positive back EMF and SCR's 1 and 8 for negative back EMF. In the motor mode for negative $V_O$, SCR's 4 and 5 are fired for positive back EMF and SCR's 7 and 2 for negative back EMF. In each of the two modes, motor and generator, the sequence repeats itself. Decoder 60 may be implemented by a group of AND gates 82, 84, 86, 88, 90, 92, 94, and 96, FIG. 5 with inverters 99.

The rotary electrical machine 12, and more specifically a motor-generator 12a, may be implemented by a two-phase field-modulated inductor motor-generator 100, FIG. 6, and includes an inductor rotor 101 surrounded by an eight tooth stator including stator teeth 102, 104, 106, 108, 110, 112, 114, and 116. The stator structure is omitted for clarity. Armature or input-output winding 118 is wound on the stator and has access through two terminals 120. Field A and field B are also wound on the stator, windings 121, 123 respectively, and have access to their terminals 122 and 124 respectively. The structure shown in FIG. 6 represents but one phase of the two-phase motor-generator. The second phase is simply a duplicate of the first, axially stacked with the portion shown and with the teeth 102–116 shifted to provide a second phase at 90° with respect to the first phase. The field A winding 121 makes teeth 102, 104, 106, and 108 assume one magnetic polarity, and teeth 110, 112, 114 and 116 assume the opposite polarity. Field B winding 123 for the generator mode causes teeth 102, 106, 110, and 114 to add flux in the same direction as field A and to oppose field A in teeth 104, 108, 112 and 116.

The chart in FIG. 6A shows the combined effect of fields A and B on the stator teeth.

Figure 7:
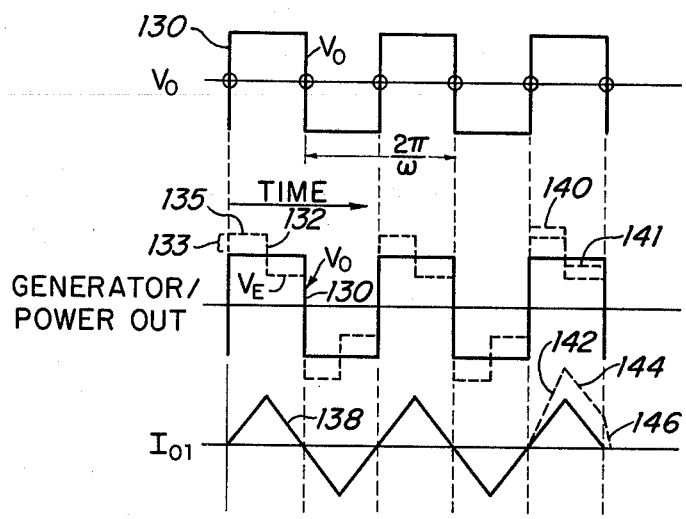
FIG. 7 shows idealized waveforms for the voltage output superimposed on the back EMF of the machine operating as a generator and the current output.

In the generator mode, when the lower frequency is zero or D.C. at terminal 26 and output line 28, the idealized waveforms for one phase of a two-phase system are as shown in FIG. 7, assuming that the machine has an inductive output impedance, which is normally the case. $V_O$ 130, FIG. 7, is a square wave, and the generator output, or the back EMF of machine 12, $V_E$, has a step shape as shown at 132 with $V_O$ 130 superimposed on it. $V_E$ 132 is formed by the combination of the voltage due to field A, $V_A$ 134, FIG. 8, the voltage due to field B, $V_B$ 136, FIG. 8. The combination of these two waveforms results in $V_E$ 132, shown in full lines in FIG. 8 and in dashed lines in FIG. 7, superimposed on $V_O$ 130. It is the control over the relative amplitudes of these two voltages, $V_A$ and $V_B$, which enable this motor-generator to vary the phase relationship and the amplitude relationship of the voltages and currents.

Figure 8:
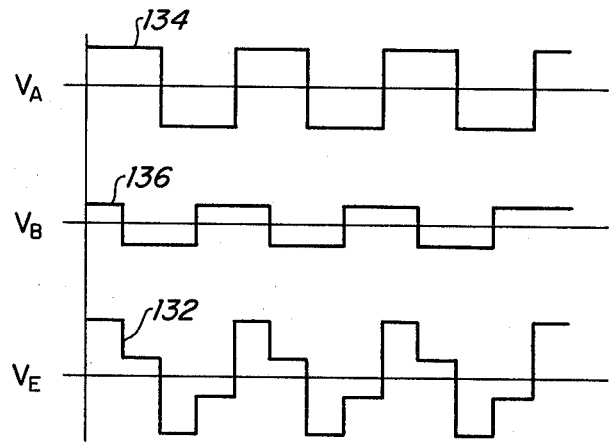
FIG. 8 shows the voltage due to field A and the voltage due to field B and the back EMF voltage resulting from the summation of voltages due to A and B.
Figure 9:
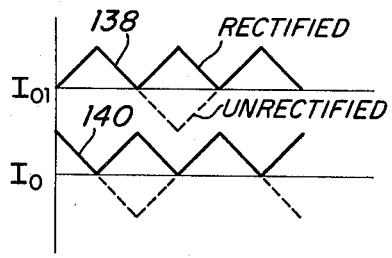
FIG. 9 shows the current output waveform for each of the phases in a two-phase system.

$V_E$ 132, in the form shown in FIGS. 7 and 8, produces an output current, $I_O$ 138, in FIG. 7. This $I_O$ is actually $I_{O1}$ or the output current for phase 1. The same wave shapes shifted 90° apply to the second phase of the system, and the two output currents $I_{O1}$ 138 and $I_{O2}$ 140 are shown in solid lines after rectification in FIG. 9. The sum of the rectified solid line waveforms 138 and 140 closely approximates the desired zero frequency or D.C. output. The portion of $V_E$ which induces the current 138 is that voltage difference 133 between the salient portion 135 of $V_E$ 132 and the top of $V_O$.

Figure 10:
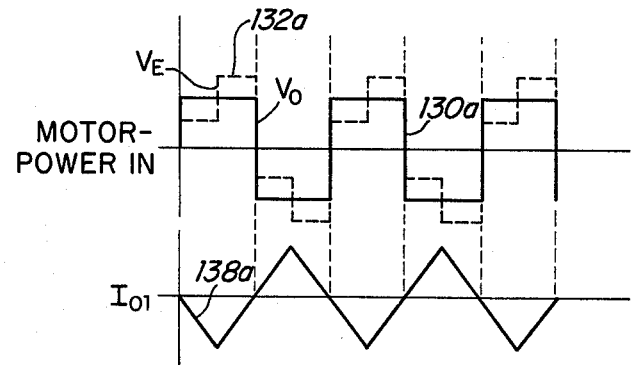
FIG. 10 shows the voltage output superimposed on the back EMF voltage and the current voltage waveforms for the case when the machine is operated as a motor.

When the system is operated as a motor, FIG. 10, $V_O$ 130a appears the same as $V_O$ 130, but each portion of $V_E$ 132a appears as a mirror image of the similar portion of $V_E$ 132, due to the fact that in the motor operation the current is moving in the opposite direction, or is 180° out of phase with respect to that same current in the generator mode. Thus the output current $I_{O1}$ 138a, FIG. 10, is similarly shifted by 180° with respect to the output current $I_{O1}$ 138, FIG. 7.

The dual field system controls the phase relationship of the output current $I_{O1}$ with respect to the machine back EMF $V_E$. If, for example, the field voltage $V_A$, FIG. 8, should increase relative to $V_O$, FIG. 7, the portion 140 of $V_E$ 132 would increase, causing a resulting increase in the positive slope 142 of the associated portion of $I_O$ 138, FIG. 7. The negative slope 144 of current $I_O$ would not be as steep, due to raised level 141, and therefore not reach zero before the voltage $V_E$ switched from positive to negative. However, at that point the slope would become much steeper as at 146, and would soon after pass through zero. Because of this occurrence, there would be a virtual phase shift between $I_O$ and $V_E$. This would be detected by field control circuit 13, FIG. 1, by means of phase-sensitive detector 36, which compares the phase of $I_O$ from polarity indicator 32 and that of $V_E$ from encoder 34. The resulting error output from phase-sensitive detector 36 drives amplifier 38 to cause field A 14 to decrease the field voltage and thereby decrease voltage level $V_A$ so that levels 140 and 141 are symmetrically disposed about the output voltage $V_O$, FIG. 7, and thus restore $I_O$ waveform 138 to its normal form.

With an alternating current load or power source at terminal 26, line 28, FIG. 1, $V_O$ appears as sine wave 130b and $V_E$, the back EMF of the machine, appears as waveforms 132b. With a two-phase system supplying an A.C. load instead of a D.C. load, the wave shapes for varying power factors are shown in FIGS. 11A, B, and C. In FIG. 11A, output voltage $V_O$ 130b, is sinusoidal, while the back EMF of the machine $V_E$ 132b, is similar to $V_O$ 132 for the direct current output, FIG. 7, but varying in amplitude. This is so because as $V_O$ on line 28 varies, so too does the input to comparator 40, amplifier 42. Thus as $V_O$ increases, so too does the field voltage $V_E$. This causes the salient portions 135 of $V_E$ 132b, FIG. 11A, to increase, thereby increasing the voltage difference 133a, which causes the current to increase, so that the current $I_O$ follows the voltage $V_O$, ideally exactly, in FIG. 11A, since the system is operating at a unity power factor.

If, however, the power factor is zero as shown in FIG. 11B, the voltage difference 133b becomes minimum at the higher values of voltage and maximum at the minimum values of voltage, so that the current is out of phase by 90° with the voltage.

With reference to FIG. 2, if the power factor is to be controlled, the phase of the voltage $V_O$ and current $I_P$, sensed on line 52, are compared in phase-sensitive detector 51. If a phase difference is detected an error signal is generated to phase shift the current reference supplied to control circuit 20 via load levelling programmer 50, so that the modulation of field B 16 adjusts the voltage differences 133 and thereby shifts the current $I_O$ toward the desired phase relationship or power factor with respect to the voltage $V_O$.

In the motor mode, FIG. 11C, the wave shapes are similar but those of $V_E$ are reversed.

In a three-phase system, the waveforms for one phase with a zero frequency of D.C. load are shown in FIG. 12. There, $V_A$ FIG. 12, appears generally the same as $V_B$, and has a more symmetrical shape, and $V_E$ has three steps instead of two relative to counterpart waveforms in FIGS. 7-10. The resulting output currents, $I_{O1}$, $I_{O2}$, and $I_{O3}$, the three different stator/armature currents from the three different phases, have truncated triangular waveforms which are phased at 120° to one another and more nearly approximate uniform D.C. output per phase than the two-phase system.

FIGS. 13A and B depict $V_O$ and $V_E$ for one phase of a three-phase system during an A.C. load for unity and zero power factors in the generator mode, and FIG. 13C depicts them for unity power factor in the motor mode.

The rotary electrical machine 12 according to this invention may be structured as shown in FIG. 14, where one phase of a three-phase generator 100a is shown, and the second and third phases are axially stacked with the one shown. Machine 100a includes twelve poles 202-226, in contrast to the eight poles of machine 100, FIG. 6. Winding 120a of field A is wound so that stator teeth 208, 210, 212, 214, 216, 218 are baised with one magnetic polarity, and stator teeth 220, 222, 224, 202, 204, and 206 with the opposite magnetic polarity. Winding 123a of field B, for the generator mode, makes the flux in 206, 212, 218 and 224 aid field A, and the flux in teeth 202, 208, 214, and 220 oppose field A.

Machine 12 may also be constructed as a wound rotor-generator design 100b, FIG. 15, in which both the field A winding 250 and field B winding 252 are wound in slots on rotor 254 to interact with armature windings 256, 258, and 260, accessible through terminals 262, 264, and 266, respectively, located on stator 270. With this wound rotor design, all three windings for a three-phase output may be provided in the same stator portion. Rotor 254 includes six poles 280, 282, 284, 286, 288, and 290, in which the fields A and B combine to produce a resulting field +A; +A −B; −A −B; −A; −A +B; A +B; respectively.

Although a specific switching circuit, firing circuit and field control circuits have been shown in the embodiment of the power conversion system for use with the dual field rotary machine, this is not a necessary limitation of the machine invention. The dual field machine is useful in other applications and with other switching and control circuits. In addition, the specific techniques for determining amplitude, phase, zero crossovers, polarity and other control criteria are illustrative only and not limitations on either the dual-field machine feature of the invention or the power conversion system feature of this invention.

Other embodiments will occur to those skilled in the art and are within the following claims:

What is claimed is:

1. A rotary electrical machine for use in power conversion between a higher frequency power signal and a lower frequency power signal including: a rotor; a stator; an armature; and first and second independently controllable field windings in spatial quadrature for selectively shaping the back EMF waveform of the machine to control the amplitude and phase relation of the voltage and current outputs of the machine;
   a first field control circuit responsive to the phase difference between the voltage and current of the higher frequency signal generated in the armature winding of the machine for driving said first field winding to minimize said phase difference;
   a second field control circuit for monitoring the amplitude difference between a selected one of the voltage and current parameters of said lower frequency signal and a reference level for driving said second field winding to adjust that load signal amplitude toward said reference level; and
   switching means responsive to said higher frequency signal and said lower frequency signal for selectively transferring power between said higher and lower frequency signals.

2. A power conversion system for converting between electrical power at different frequencies, comprising:
   a rotary electrical machine including a rotor, a stator, first and second independently controllable field windings, and at least one armature winding for each phase;
   a switching circuit including a plurality of switching devices and having first terminal means interconnected with said armature winding which carries a higher frequency signal established by said machine and a second terminal means for interconnection with an impedance establishing a lower frequency signal;
   a first field control circuit for monitoring said machine to sense phase difference between the optimum zero crossings and actual zero crossings of said higher frequency signal for driving said first field winding to adjust the phase of said higher frequency signal to minimize said phase difference;
   a second field control circuit for modulating said higher frequency signal carried by said armature winding with said lower frequency signal and for monitoring said second terminal means to sense amplitude difference between a selected one of the voltage and current parameters of said lower frequency signal and a reference level for driving said second field winding to adjust the parameter towards said reference level; and
   a switch-firing circuit responsive to machine voltage and said voltage and current parameter of said lower frequency signal at said second terminal means for selectively triggering to the on state and self-commutating to the off state said switching devices synchronously with said zero crossings of said higher frequency signal for transferring power between said higher and lower frequency signals through said switching circuit.

3. The system of claim 2 in which said machine is a motor generator which is capable of operating in a motor mode and generator mode and whose rotor is adapted for connection to a mechanical load and drive, said impedance is an electrical load and power source, and said power transfer through said switching circuit occurs in the generator mode by detecting said lower frequency signal from said higher frequency signal and presenting said lower frequency signal at said second terminal means and in the motor mode by chopping said lower frequency signal and presenting it at said first terminal means.

4. The system of claim 2 in which said machine is a motor, said impedance is an electrical power source, and said power transfer through said switching circuit occurs by chopping of said lower frequency signal at the frequency of said higher frequency signal and presenting it at said first terminal means.

5. The system of claim 2 in which said machine is a generator, said impedance is an electrical load, and said power transfer through said switching circuit occurs by detecting the lower frequency signal from the higher frequency signal and presenting it at said second terminal.

6. The system of claim 2 in which said impedance includes an electrical power source and said second field control circuit monitors the current parameter of said lower frequency signal at said second terminal means.

7. The system of claim 2 in which said impedance includes an electrical load and said second field control circuit monitors the voltage parameter of said lower frequency signal at said second terminal means.

8. The system of claim 2 in which said field windings are in spatial quadrature.

9. The system of claim 2 in which said field windings are on said rotor.

10. The system of claim 2 in which said field windings are on said stator.

11. The system of claim 2 in which said armature winding is on said stator.

12. The system of claim 2 in which said machine is single phase and includes one armature winding and one pair of first and second field windings.

13. The system of claim 2 in which said machine is n phase and includes n armature windings and n pairs of first and second field windings.

14. The system of claim 2 in which said switching circuit includes one set of switching devices for each phase, each set including four pairs of parallel connected, oppositely polarized, semiconductor switches interconnected between two bus lines extending between said first and second terminal means, one of said pairs connected in series in each of said bus lines and the other two of said pairs cross-connected between said bus lines.

15. The system of claim 14 in which said semiconductor devices are SCR's.

16. The system of claim 2 in which said first field control circuit includes a rotor position sensor for determining said machine voltage optimum zero crossing, a zero cross over detector circuit for detecting actual zero crossovers of said higher frequency signal at said first terminal, and a phase-sensitive detector responsive to said rotor position sensor and said zero crossover detector circuit.

17. The system of claim 2 in which said second field control circuit includes a comparator circuit for comparing said selected parameter with said reference level.

18. The system of claim 2 in which said switch firing circuit includes logic means responsive to said actual zero crossovers and optimum zero crossovers of said higher frequency signal at said first terminal and to the voltage and current parameters of said lower frequency signal at said second terminal means for sequentially actuating selected ones of said switching devices.

19. A power conversion system for converting between electrical power at different frequencies, comprising:
a motor generator which is capable of operating in a motor mode and a generator mode and whose rotor is adapted for connection to a mechanical load and drive, said motor-generator including a rotor, a stator, first and second independently controllable field windings, and at least one armature winding for each phase;
a switching circuit including a plurality of switching devices and having first terminal means interconnected with said armature winding which carries a higher frequency signal established by said machine and a second terminal means for interconnection with an electrical load and power source;
a first field control circuit for monitoring said machine to sense phase difference between the optimum zero crossings of said higher frequency signal for driving said first field winding to adjust the phase of said higher frequency signal to minimize said phase difference;
a second field control circuit for modulating said higher frequency signal carried by said armature winding with said lower frequency signal and for monitoring said second terminal means to sense amplitude difference between a selected one of the voltage and current parameters of said lower frequency signal and a reference level for driving said second field winding to adjust that parameter towards said reference level; and a switch-firing circuit responsive to machine voltage and said voltage and current parameters of said lower frequency signal at said second terminal means for selectively triggering to the on state and self-commutating to the off state said switching devices synchronously with said zero crossings of said higher frequency signal for transferring power between said higher and lower frequency signals through said switching circuit in the generator mode by detecting said lower frequency signal from said higher frequency signal and presenting said lower frequency signal at said second terminal means and in the motor mode by chopping said lower frequency signal at the frequency of said higher frequency signal and presenting it at said first terminal means.

20. A power conversion system for converting between electrical power at different frequencies, comprising:
a motor including a rotor, a stator, first and second independently controllable field windings and at least one armature winding for each phase;
a switching circuit including a plurality of switching devices and having first terminal means interconnected with said armature winding which carries a higher frequency signal established by said machine and a second terminal means for interconnection with an electrical power source establishing a lower frequency signal;
a first field control circuit for monitoring said machine to sense phase difference between the optimum zero crossings and actual zero crossings of said higher frequency signal for driving said first field winding to adjust the phase of said higher frequency signal to minimize said phase difference;
a second field control circuit for modulating said higher frequency signal carried by said armature winding with said lower frequency signal and for monitoring said second terminal means to sense amplitude difference between a selected one of the voltage and current parameters of said lower frequency signal and a reference level for driving said second field winding to adjust that parameter towards said reference level; and
a switch-firing circuit responsive to machine voltage and said voltage and current parameters of said lower frequency signal at said second terminal means for selectively triggering to the on state and self-commutating to the off state said switching devices synchronously with said zero crossings of said higher frequency signal for transferring power between said higher and lower frequency signals through said switching circuit by chopping said lower frequency signal at the frequency of said higher frequency signal and presenting it at the first terminal.

21. A power conversion system for converting between electrical power at different frequencies, comprising:
- a generator including a rotor, a stator, first and second independently controllable field windings and at least one armature winding for each phase;
- a switching circuit including a plurality of switching devices and having first terminal means interconnected with said armature winding which carries a higher frequency signal established by said machine and a second terminal means for interconnection with an electrical load establishing a lower frequency signal;
- a first field control circuit for monitoring said machine to sense phase difference between the optimum zero crossings and actual zero crossings of said higher frequency signal for driving said first field winding to adjust the phase of said higher frequency signal to minimize said phase difference;
- a second field control circuit for modulating said higher frequency signal carried by said armature winding with said lower frequency signal and for monitoring said second terminal means to sense amplitude difference between a selected one of the voltage and current parameters of said lower frequency signal and a reference level for driving said second field winding to adjust that parameter towards said reference level; and
- a switch-firing circuit responsive to machine voltage and said voltage and current parameters of said lower frequency signal at said second terminal means for selectively triggering to the on state and self-commutating to the off state said switching devices synchronously with said zero crossings of said higher frequency signal for transferring power between said higher and lower frequency signals through said switching circuit by detecting the lower frequency signal from the higher frequency signal and presenting it at said second terminal.

* * * * *